United States Patent [19]

Jones et al.

[11] Patent Number: 5,336,514
[45] Date of Patent: * Aug. 9, 1994

[54] WHIPPABLE NON-DIARY CREAM BASED ON LIQUID OIL

[75] Inventors: Malcolm G. Jones, Stevington; Ian M. Kimsey, Radwell; Anthony Morrison; Jeanette Y. Wong, both of Bedford; Jan Van Heteren, Esher, all of Great Britain

[73] Assignee: Van Den Bergh Foods Co., Division of Conopco, Inc., Lisle, Ill.

[*] Notice: The portion of the term of this patent subsequent to Sep. 22, 2009 has been disclaimed.

[21] Appl. No.: 5,911

[22] Filed: Jan. 19, 1993

Related U.S. Application Data

[63] Continuation of Ser. No. 737,090, Jul. 29, 1991, abandoned.

[30] Foreign Application Priority Data

Jul. 30, 1990 [EP] European Pat. Off. ........ 90202076.7
Sep. 27, 1990 [GB] United Kingdom ................ 9021011

[51] Int. Cl.$^5$ ............................................. A23C 13/00
[52] U.S. Cl. ..................................... 426/564; 426/602
[58] Field of Search ............... 426/564, 565, 570, 586, 426/602

[56] References Cited

U.S. PATENT DOCUMENTS

| | | |
|---|---|---|
| 3,628,968 | 4/1968 | Noznick . |
| 3,903,310 | 9/1975 | Buide et al. ................. 426/564 |
| 3,935,324 | 1/1976 | Persmark et al. . |
| 3,944,680 | 3/1976 | van Pelt et al. . |
| 3,979,526 | 9/1976 | Suzuki et al. . |
| 4,107,343 | 8/1978 | Petricca . |
| 4,396,638 | 8/1983 | Edo et al. . |
| 4,637,937 | 1/1987 | Terada et al. . |
| 4,798,734 | 1/1989 | Kaneda . |
| 5,135,768 | 8/1992 | Campbell ..................... 426/602 |
| 5,149,557 | 9/1992 | Morrison ..................... 426/570 |
| 5,190,781 | 3/1993 | Van Herteren ............... 426/602 |
| 5,217,742 | 6/1993 | Jones .......................... 426/602 |

FOREIGN PATENT DOCUMENTS

| | | |
|---|---|---|
| 98663 | 1/1982 | European Pat. Off. . |
| 95001 | 11/1983 | European Pat. Off. . |
| 294119 | 12/1988 | European Pat. Off. . |
| 379747 | 1/1990 | European Pat. Off. . |
| 420315 | 3/1991 | European Pat. Off. . |
| 2315856 | 7/1975 | France . |
| 58-086056 | 5/1983 | Japan . |
| 58-116647 | 7/1983 | Japan . |
| 1080998 | 8/1967 | United Kingdom . |
| 2080325 | 2/1982 | United Kingdom . |
| 88/04525 | 6/1988 | World Int. Prop. O. . |

OTHER PUBLICATIONS

Bailey's Industrial Oil and Fat Products, v 1, 4th Ed., pp. 385 & 401.
Food Colloids, Edited by Bee, R. D. et al., Special Pub. #75 pp. 272–282.
Food Technology, v 29, #7 (Jul., 1975) 3, 4 and 52–62.

Primary Examiner—Carolyn Paden
Attorney, Agent, or Firm—A. Kate Huffman

[57] ABSTRACT

The invention concerns with whippable non-dairy creams with fat levels of 15–60 wt %, wherein the fat consists for 25–85 wt % of a liquid oil and for the rest of a hard fat that possess excellent properties, like a whipping time less than 6 min. Also a production-process is described, which includes a tempering step to make the NDC whippable within 4 min.

20 Claims, No Drawings

WHIPPABLE NON-DIARY CREAM BASED ON LIQUID OIL

This is a continuation or application of Ser. No. 07/737,090, filed Jul. 29, 1991, now abandoned.

FIELD OF THE INVENTION

So far whippable non-dairy creams are known, which comprise emulsions of an aqueous phase, containing optionally one or more milk components and thickener and a vegetable fat phase, which contains vegetable fat and an emulsifier system. These creams however do normally not contain significant amounts of liquid oils. High liquid oil levels make them unwhippable with an ordinary domestic, electrical whipper (e.g. a Kenwood-Chef). This means, that whippable NDC's with a high content in especially polyunsaturated fatty acids (=PUFA) could not be made so far.

BACKGROUND OF THE INVENTION

In Japanese patent application 58116-647 a whippable cream is disclosed, consisting of 0.1–2% of a sugar fatty acid, 0.5–5% of triglycerides with a melting point of at least 50° C. and 0.05–0.5% of pyrophosphoric acid or its salts. The rest of the fatphase can consist of cottonseed oil, corn oil, soybean oil or palm oil. However, in order to make these whippable creams, it is necessary to use sugar fatty acid compounds and pyrophosphoric acid. Moreover, it is not clear from this reference, how much of a liquid oil, especially an oil rich in PUFA, can be present in the composition.

From GB 2 162 039 NDC's, based on vegetable fats, are known, that contain a soybean aqueous infusion, a soy cellulose, admixed with vegetable oil and/or hardened vegetable oil and alginic acid derivatives or gelatin, a sugar ester and a polyphosphate salt. Therefore these NDC's always contain a soybean aqueous infusion. Nothing is disclosed about the properties of NDC's with a high content of liquid oils, in particular high PUFA-liquid oils.

In U.S. Pat. No. 3,979,526 whipping creams are described, that consist of defatted milk products, e.g. dialysed milk, and a vegetable oil, which are emulsified. However, the products of this US patent do not possess a whipped cream structure, but are soft foams.

Japanese patent application 58086-056 describes whippable creams, which are made by pre-emulsifying a particular oil and fat, i.e. with a "rising melting point of 15°–45° C." with quite a lot of milk solids. From this reference nothing can be concluded about the properties of whippable NDC's with a high content of PUFA-rich liquid oils.

G 2 080 325 discloses margarine-emulsions with a fat continuous phase, that are made from emulsions with a water continuous phase. The fat phase consists partly of globular fats which are coated with a lipoprotein film. Nothing can be derived from this reference about NDC's with a high content of liquid oils.

SUMMARY OF THE INVENTION

We have now found whippable NDC's, that have a high content of liquid oils, in particular of high PUFA liquid oils. These NDC's are therefore healthier than the known NDC's, whereas the other properties of these NDC's, like whip time, overrun, viscosity and firmness are very satisfactory.

DETAILED DESCRIPTION OF THE PREFERRED EMBODIMENT

Therefore our invention concerns in the first place with a whippable non-dairy cream (NDC), comprising an emulsion of a water-continuous phase, containing optionally one or more milk components, preferably butter milk powder (BMP) and thickeners and a fat phase, comprising fat and an emulsifier system, wherein the NDC contains 15–60 wt % of a substantially globular vegetable fat from which 20–85 wt % preferably 30–75% consists of a liquid oil and the rest of a hard fat and which NDC contains at least 5 wt % of hard fat and is whippable within 6 minutes, preferably within 4 minutes, when using a domestic, electrical whipper (e.g. the Kenwood-Chef).

The mean droplet size of the fat particles in our NDC's is less than 5.0 um, preferably less than 2.0 μm, most preferably less than 1.0 μm.

Our NDC preferably contains 25–50 wt % fat, whereas the hard fat can be chosen from the group consisting of palmkernel, hardened palmkernel, coconut, hardened coconut, hardened rape oil, hardened palm oil, hardened soy bean oil, butter fat and mixture thereof. Interesterified mixture of those fats can also be used. From these fats we preferably use a hardened mixture of palm oil mid fraction and soybean oil in particular a mixture of hardened palmkernel m p 38° C. and coconut. The two components of this last mixture preferably are present in weight ratios of 25:75–75:25, more preferably 40:60–60:40. Although the fat phase can contain butter fat, we prefer to limit the amount of butter fat in the NDC to a maximum of 10 wt %, preferably less than 4 wt %. At least part of the fat can be replaced by well known fat replacers, e.g. polyol fatty acid polyesters. Examples of these polyesters are described in U.S. Pat. Nos. 3,600,186, 4,005,195 or EP Pat. Publ. Nos. 233,856, 236,288 and 235,836.

In the composition also an emulsifier system is present. This emulsifier system can consist of every kind of known emulsifier, but preferably Lactodan (a Greensted product), lecithines, polyglycerolesters, DATA-esters, poly oxyethylene sorbitan esters (=Tween) and/or monoglycerides are used. In order to obtain the desired whipping properties our NDC's preferably contain a mixture of a stabilising and of a destabilising emulsifier. Examples of stabilising emulsifiers are polyglycerolesters, poly oxyethylene sorbitan esters or monoglycerides from saturated fatty acids, in particular with 16–18 carbon atoms. Destabilising emulsifiers are DATA-esters, lactodan, lecithines and derivatives of unsaturated (or polyunsaturated) fatty acids of polyglycerolesters, polyoxyethylene sorbitan esters or monoglycerides. The IV of those products is at least 20. The fatty acids in this case contain at least 18 C-atoms. The most preferred emulsifiers do contain Triodan (=polyglycerolester), lecithin and/or Hymono (=mono-glycerides), in particular those that are derived from unsaturated fatty acids or fats. The unsaturated fatty acids in these preferred emulsifiers preferably possess an IV of at least 20. Each individual stabilising emulsifier, that is used in the NDC, is present in an amount of at least 0.01 wt %, preferably 0.01–2.0 wt %. The destabilising emulsifier is present in an amount of at least 0.005 wt %, in particular 0.005–1.0 wt %. The total amount of emulsifier, that is used is less in general than 0.80 wt %.

The liquid oil, that can be used is normally chosen from the group consisting of sunflower oil, safflower oil, rapeseed oil, maize oil, bean oil, ground nut oil, olive oil and cottonseed oil.

We prefer to use liquid oils, that contain 10-80 wt % polyunsaturated fatty acids (=PUFA), 4-18 wt % saturated fatty acids (=SAFA) and 12-80 wt % mono unsaturated fatty acids (=MUFA). The preferred composition is 30-60% PUFA, 6-15% SAFA and 20-60% MUFA.

The total fatphase of our NDC's preferably displays a PUFA/SAFA-weight ratio ranging from 0.2-3.0, in particular 0.5-2.0.

The SAFA-level of the fat phase of our NDC's is preferably less than 70 wt %, more preferably less than 50 wt %.

In order to improve the taste of an NDC it is well known to add some amount of butter milk component to the NDC. We therefore prefer NDC's, that contain up to 10 wt %, preferably up to 7 wt % butter milk powder (BMP).

The NDC's according to the invention also contain thickeners. As thickeners the following compounds can be used: guar gum, locust bean gum, carrageenan, xanthan gum, alginates, cellulose ethers or mixtures thereof. The NDC further can contain sugar and flavours.

The invention also comprises a method for the preparation of the whippable NDC according to the invention, mentioned above.

In the art whippable NDC's are obtained by making an emulsion of an aqueous phase, containing BMP and thickeners and a fat phase, containing the emulsifier system. These two phases are homogenised at about 60° C., after which a homogenised premix is obtained. This premix is treated with steam, according to a UHT-treatment (i.e. about 2.5 seconds with steam of about 150° C.), in order to sterilise the premix. The sterilised premix is homogenised in one or two stages, after which a sterilised, homogenised product with a temperature of about 60° C. is obtained. This product is cooled and stored at a temperature of 5°-10° C.

However, when we use this process for the production of our NDC's with a high liquid oil content it is often difficult to obtain a NDC, that is whippable within 6 minutes. In particular when the emulsifier does not contain a stabilising and a destabilising emulsifier simultaneously the NDC easily becomes too stable and cannot be whipped, as an NDC that is too stable requires very long whipping times, if whipping is possible at all.

For those NDC's that are too stable, when prepared according to the prior art method, we have found a new process, which makes those unwhippable NDC's whippable within 4 minutes. This new process includes a tempering step at the end of the normal NDC making process. Therefore our NDC manufacturing process comprises the making of an emulsion of a water phase, containing thickener and optionally one or more milk components and a fat phase, containing fat and an emulsifier system, processing the so obtained emulsion by heating, sterilisation, homogenisation and cooling to a temperature below 25° C. and which process is characterized by a tempering step, which is carried out immediately, after the cooling, by warming the emulsion to ambient temperature and keeping it at this temperature for several hours, after which the NDC is cooled to 5°-20° C.

The emulsion is heated before the sterilisation advantageously to a temperature of 55°-85° C. The sterilisation, which is proceeded after this heating is preferably carried out as a UHT-treatment by injecting steam of high temperature (130°-150° C.) during a short time (less than 30 seconds, preferably 1-5 seconds). The homogenisation is carried out, while the emulsion is at a temperature above ambient, preferably 50°-85° C.

The cooling of the NDC after the homogenisation is normally proceeded to a temperature below 20° C., preferably below 10° C.

In the tempering step the emulsion normally is warmed to a temperature of 18°-25° C., at which temperature the NDC is kept for 18-30 hours.

EXAMPLE I

Three different emulsions were made of the ingredients mentioned in table 1. Two emulsions contained 42% total fat and the third emulsion contained 35% fat. The emulsions were water continuous.

The composition of the fat phases in terms of amounts PUFA, SAFA and MUFA is mentioned in table 2. The hard stock used in the fat phase was a hardened mixture of a palm mid fraction and bean oil with a PUFA, SAFA, MUFA-distribution of 1% PUFA, 36.5% SAFA and 62.5% MUFA. The PUFA, SAFA and MUFA-contents of the liquid oils of the fat phase are given in table 4.

These emulsions were heated to 80° C. and treated with steam (145° C.) during 3 seconds.

The emulsions so obtained were homogenised, using pressures of 100 and 70 bar in 2 stages. This way sterilised, homogenized products with a temperature of 80° C. were obtained. These products were cooled to 8° C., warmed again to 20° C., kept at this temperature for 24 hours and cooled again to 5° C. and stored for 1 week.

The NDC's showed the characteristics mentioned in table 3.

EXAMPLE II

An emulsion was made comprising the components mentioned in table 5.

The procedure of example I was followed, except that homogenisation pressures of 70 and 30 bar were used in the 2 stages.

The product was cooled to 8° C. and tempered as before. The amount of SAFA in the product was 23/100 g. The properties of the product are mentioned in table 5.

TABLE 1

| | P.U.F.A. Creams | | |
|---|---|---|---|
| | 42% Fat | | 35% fat |
| | (1) % | (2) % | (1) % |
| Water | 50.7 | 50.7 | 58.1 |
| Buttermilk powder | 7.0 | 7.0 | 7.0 |
| Thickener (GG + LBG) | 0.07 | 0.07 | 0.12 |
| Sunflower oil | — | 30.1 | — |
| Safflower oil | 25.3 | — | 21.0 |
| hard fat | 16.3 | 11.5 | 13.2 |
| emulsifiers | 0.63 | 0.63 | 0.63 |

(Mixture of sat. and unsat. Triodans + sat. Hymono)

TABLE 2

| Total fat | 42.6 | 42.6 | 35.3 |
|---|---|---|---|
| P.U.F.A. | 45.9 | 46.0 | 45.8 |

TABLE 2-continued

| | | | |
|---|---|---|---|
| M.U.F.A. | 32.0 | 34.6 | 32.1 |
| S.A.F.A. | 22.1 | 19.4 | 22.1 |

TABLE 3

| | P.U.F.A. creams | | |
|---|---|---|---|
| | 42% Fat | | 35% fat |
| Properties | (1) | (2) | (1) |
| Solids in emulsion at 5° C. | 16% | 12.5% | 13.5% |
| Whip time | 2 min. 8 sec. | 2 min. 13 sec. | 3 min. 23 |
| overrun | 207% | 191% | 236% |
| Boucher firmness | 84 | 64 | 75 |
| Liquid viscosity 5° C./100 sec$^{-1}$ | 58 mPas | 89 mPas | 48 mPas |

TABLE 4

| | Low SAFA/PUFA creams | | |
|---|---|---|---|
| | Fats employed | | |
| | PUFA | SAFA | MUFA |
| A. PUFA-oil | | | |
| 1. SF | 64.0 | 11.0 | 25.0 |
| 2. SA | 75.5 | 10.7 | 13.8 |
| B. HARDSTOCK | 1.0 | 36.5 | 62.5 |

TABLE 5

| Composition | wt % |
|---|---|
| BMP | 7.0 |
| guar gum | 0.1 |
| CN | 14.2 |
| PK 38 | 7.8 |
| Sunflower oil | 12.0 |
| Triodan 55 (saturated) | 0.4 |
| β-carotene | 0.02 |
| water | 58.48 |
| Properties | |
| Solids in emulsion at 5° C. | 14.8% |
| droplet size | 0.85 μm |
| whip time | 2 min 45 sec |
| overrun | 180% |
| Boucher | 88 |
| viscosity (5° C., 100 sec$^{-1}$) | 82 mPa · s. |

EXAMPLE III

The procedure as described in example I was used to make a whipping cream with the properties mentioned in table 6 with the following composition:

TABLE 6

| composition | wt % |
|---|---|
| PK 38 | 19.0 |
| butterfat | 7.5 |
| liquid RP | 8.0 |
| Tween 60 (sat. polyoxyethylene sorbitan esters) | 0.25 |
| Triodan - 20 (unsat) | 0.1 |
| BMP | 7.0 |
| thickeners | 0.1 |
| water | up to 100% |
| SAFA-content g/100 g: | 21 |
| Trans-content | 1 |
| Properties | |
| Solids in emulsion at 5° C. | 16.8% |
| droplet size | 0.65 μm |
| whip time | 3 min 12 sec |
| overrun | 220% |

TABLE 6-continued

| Boucher | 80 |
|---|---|
| viscosity (5° C., 100 sec$^{-1}$) | 118 ↑ ↓ 105 mPa · s. |

EXAMPLE IV

The same procedure was followed for the production of a whipping cream with the properties mentioned in table 7 with the composition according to table 7.

TABLE 7

| composition | wt % |
|---|---|
| SF | 35 |
| BO-44 | 8.8 |
| Butterfat | 5.2 |
| BMP | 7.0 |
| Triodans (mixt. of sat. and unsat.) | 0.35 |
| Hymono-3203 (saturated) | 0.20 |
| thickeners | 0.12 |
| water | balance to 100% |
| Properties | |
| Droplet size | 0.9 μm |
| whip time | 3 min 30 sec |
| overrun | 150% |
| Boucher | 80 |
| viscosity (5° C., 100 sec$^{-1}$) | 300 mPa · s. |

EXAMPLE V

An emulsion was made of the ingredients, mentioned in table 8. The procedure of example I was followed, however, the tempering was not performed. A two stage homogenisation (100 bar, followed by 35 bar) was applied. The product was cooled to 5° C. The product properties are given underneath.

TABLE 8

| Composition | wt % |
|---|---|
| Buttermilk powder | 7.0 |
| guar gum | 0.07 |
| Locust bean gum | 0.03 |
| Tween-60 | 0.35 |
| PO-43 | 14.0 |
| SF | 20.0 |
| β-carotene | 0.02 |
| water | up to 100% |
| Properties | |
| solids in emulsion at 5° C. | 10.3% |
| Droplet size | 0.63 μm |
| whip time | 4 min |
| overrun | 140% |
| Boucher | 83 |
| viscosity (5° C., 100 sec$^{-1}$) | 67 65 |

EXAMPLE VI

An emulsion was made of a composition as mentioned in table 8, however instead of 14.0% PO-43 the same amount of interesterfied fat was used. The process was as described in example V. The properties of the product were as follows:

| Properties | |
|---|---|
| solids in emulsion at 5° C. | 13.4% |
| Droplet size | 0.66 μm |
| whip time | 2.0 min |
| overrun | 165 |
| Boucher | 106 |

-continued

| Properties | |
|---|---|
| viscosity (5° C., 100 sec$^{-1}$) | 50 48 |

*used was an interesterified mixture of plam kernel 38 and Palm oil 58.

N.B. The emulsifiers, mentioned in the examples display the following characteristics:

| | sap. val | I.V. | FFA | HLB | Na-stearate |
|---|---|---|---|---|---|
| Triodan-20 | 145 | <2 | <2 | — | — |
| Triodan-55 | 130 | 80 | <2 | — | — |
| Tween-60 | 50 | — | <2 | 14.9 | 0 |
| Hymono-3203 | | 3 | <3 | | <0.1 |

We claim:

1. A whippable non-dairy cream (NDC) consisting essentially of:
   an emulsion of a water-continuous phase having one or more milk components and thickeners; and
   a fat phase comprising a fat and an emulsifier system, wherein the non-dairy cream contains 15-60 wt. % of a substantially globular vegetable fat having a mean droplet size of less than 5.0 microns,
   and 20-85 wt. % of the vegetable fat is a liquid oil having a polyunsaturated fatty acid (PUFA) content of 10-80 wt. %, a saturated fatty acid (SAFA) content of 4-18 wt. % and a monounsaturated fatty acid (MUFA) content of 12-80 wt. %, the PUFA/SAFA weight ratio of the total fat ranges being between 0.2 and 3.0 and the liquid oil is selected from the group consisting of sunflower oil, safflower oil, rapeseed oil, maize oil, bean oil, groundnut oil, olive oil and cottonseed oil, and the rest of the vegetable fat being a hard fat,
   wherein the non-dairy fat cream contains at least 5 wt. % of the hard fat and is whippable within 6 minutes when using an electrical whipper,
   and one or more optional ingredients selected from the group consisting of a flavorant, a colorant and mixtures thereof, the amount of each ingredient being an effective amount.

2. Whippable non-dairy cream (NDC) according to claim 1, which is whippable within 4 min.

3. Whippable non-dairy cream according to claim 1, wherein the NDC contains 25-50 wt % fat.

4. Whippable non-dairy cream according to claim 1, wherein the vegetable fat consists for 30-75 wt % of a liquid oil.

5. Whippable NDC, according to claim 1, wherein the hard fat is a hardened mixture of palm oil mid fraction and soybean oil.

6. Whippable NDC, according to claim 1, wherein the hard fat is a mixture of palm kernel and coconut with a ratio of the components within 25/75 and 75/25.

7. Whippable NDC, according to claim 1, wherein the milk component is a butter milk component.

8. Whippable NDC, according to claim 1, wherein the NDC contains less than 10 wt % butter fat.

9. Whippable non-dairy cream according to claim 1, wherein the mean droplet size of the fat particles is less than 2.0 um.

10. Whippable non-dairy cream according to claim 1, wherein the saturated fatty acid level of the fat phase of the non-dairy cream is less than 70 wt %.

11. A whippable non-dairy cream according to claim 1, wherein the hard fat is chosen from a group consisting of palm kernel, hardened palm kernel, coconut, hardened coconut, hardened rape oil, hardened palm oil, hardened soy bean oil, butterfat, mixtures thereof and interesterified products of the mixtures thereof.

12. A whippable non-dairy cream according to claim 1, wherein the hard fat is a mixture of a hardened palm kernel oil having a melting point of 38° C. and a coconut oil with a ratio of the components within 25/75 and 75/25.

13. A whippable non-dairy cream according to claim 1, wherein the emulsifier is selected from the group consisting of lactic acid esters of monoglycerides, diglycerides, and mono- and diglycerides, lecithin, polyglycerol esters, diacetyl tartaric esters of monoglycerides, diglycerides and mono- and diglycerides, polyoxyethylene sorbitan esters and monoglycerides.

14. Whippable non-dairy cream according to claim 13, wherein less than 0.80 wt % of the total emulsifier system is present.

15. A whippable non-dairy cream according to claim 1, wherein the emulsifier system comprises a combination of a stabilizing and destabilizing emulsifier.

16. A whippable non-dairy cream according to claim 15, wherein the non-dairy cream contains a stabilizing emulsifier chosen from the group consisting of a saturated fatty acid ester from polyglycerol, a saturated fatty acid ester from polyoxyethylene sorbitan, and a saturated fatty acid ester from a monoglyceride.

17. A whippable non-dairy cream according to claim 15, wherein the stabilizing emulsifier is present in an amount of 0.01-2.0 wt. %.

18. Whippable non-dairy cream according to claim 15, wherein the destabilising emulsifier is present in an amount of 0.005-1.0 wt %.

19. A whippable non-dairy cream according to claim 1, wherein the destabilizing emulsifier is selected from a group consisting of an unsaturated fatty acid ester from polyglycerol, an unsaturated fatty acid ester from polyoxyethylene sorbitan, an unsaturated fatty acid ester from a monoglyceride, diacetyl tartaric ester of a monoglyceride, a diglyceride and mono- and a diglyceride, a lactic acid ester of a monoglyceride, a diglyceride and a mono- and diglyceride, and a lecithin.

20. Whippable non-dairy cream according to claim 19, wherein the unsaturated fatty acids in the emulsifiers possess an iodine value of at least 20.

* * * * *